Aug. 7, 1956     G. B. DUNN ET AL     2,758,228
CAST ROTOR STRUCTURE
Filed June 14, 1955
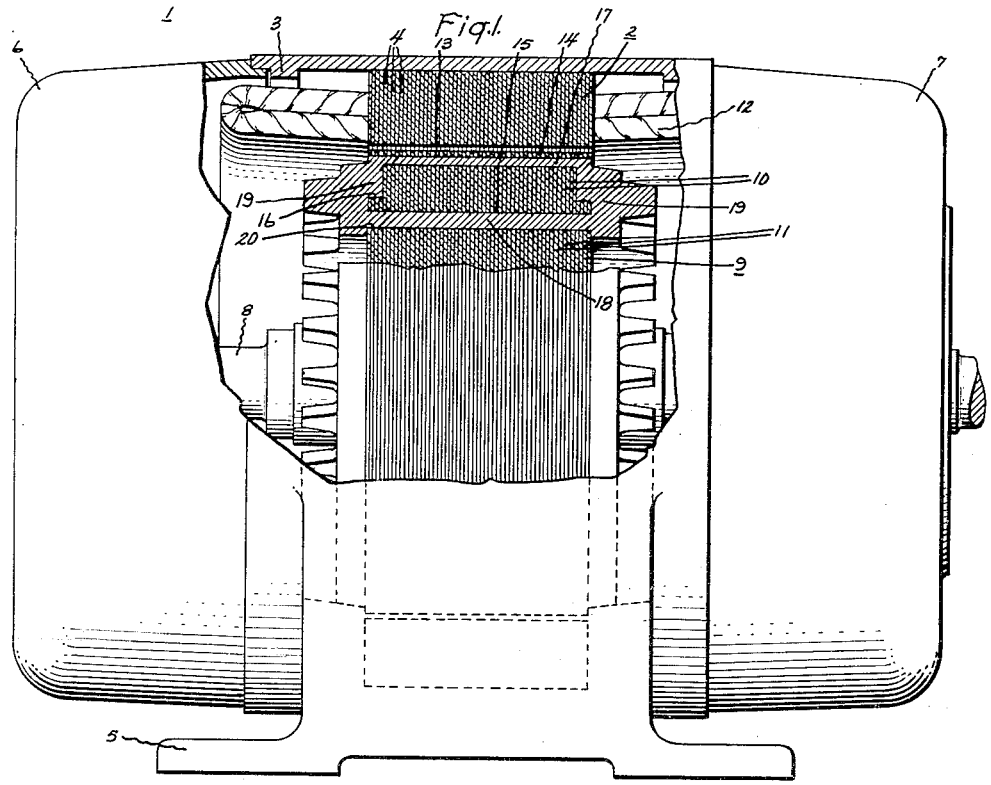
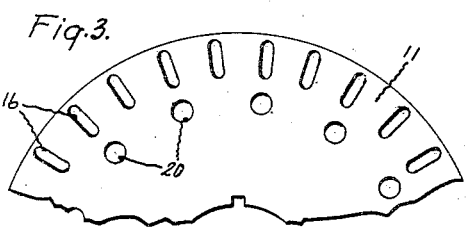
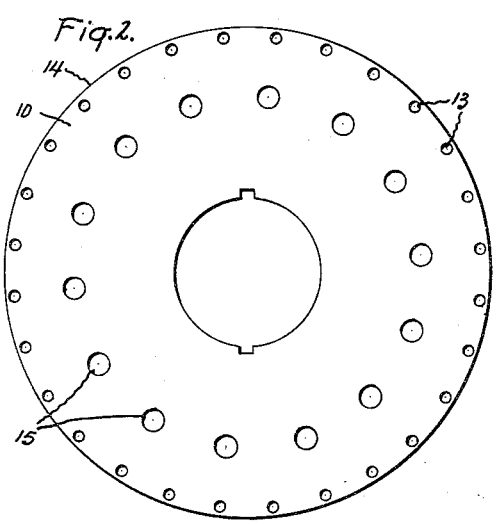
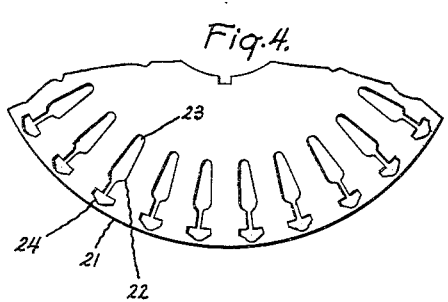
Inventors:
Donald P. Strang,
George B. Dunn,
by Robert H. Irish
Their Attorney.

United States Patent Office

2,758,228
Patented Aug. 7, 1956

2,758,228

CAST ROTOR STRUCTURE

George B. Dunn, Zanesville, and Donald P. Strang, Fort Wayne, Ind., assignors to General Electric Company, a corporation of New York Application June 14, 1955, Serial No. 515,288

7 Claims. (Cl. 310—212)

This invention relates to dynamoelectric machines, and more particularly to an improved cast rotor construction for high starting torque induction-type motors.

Induction-type electric motors are used for a great variety of purposes at the present time; in such motors, power is supplied to a stator winding which produces a flux in the stator core. This flux crosses the air gap between the stator and the rotor and induces a current in conductors located adjacent the air gap in the rotor core. Thus, in a sense, the stator winding is in effect the primary winding of a transformer and the rotor conductors form the secondary winding. The rotor conductors may be arranged in a closed or short circuited arrangement, the conductors extending along the length of the rotor and being joined at their ends. This conductor arrangement is frequently referred to as a squirrel cage and is generally achieved by a casting operation. The stator winding, or windings, are arranged so as to produce a rotating magnetic field, and the currents induced in the rotor by this magnetic field of the stator will cause the rotor to rotate in the same direction.

It has been discovered that where a high starting torque is desired in an induction motor, it is necessary that the bars of the squirrel cage of the rotor present a high electrical resistance; while this increased resistance is apt to cause relatively high running losses in a motor, there has arisen a class of motors, for use in fields where high starting torques are essential, which are designed to accommodate the higher running losses. Such motors are usually provided with squirrel cage bars of relatively small cross-sectional area which consequently provide a high electrical resistance. However, the decrease in cross-sectional area has hitherto required that the bars be formed by inserting brass bars into the rotor slots and brazing each bar to brass end rings. This was found necessary in order to provide the rotor structure with sufficient mechanical strength and at the same time sufficient electrical resistance; such strength could not be obtained in a cast structure wherein the bars were provided with the necessary small cross section. However, the insertion of preformed bars into the rotor slots and the securement of each bar to end rings is an exceedingly expensive operation compared to casting which has become the normal method of making the general run of induction motors. It is therefore, highly desirable to provide, in a high starting torque induction-type motor, an arrangement which will not detract from the resistance of the small bars or the motor torque produced thereby, but which will nonetheless permit the bars and end rings to be formed in the usual manner by casting rather than in the fashion described above.

It is, therefore, an object of this invention to provide an improved cast rotor for a high starting torque induction motor which will have the advantageous features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broader aspects, this invention provides an induction-type motor having a high resistance rotor made up of stack of laminations of magnetic material. A first plurality of spaced openings are formed in the stack so as to extend axially therethrough adjacent its periphery, and a second plurality of spaced openings are formed in the stack extending axially therethrough but located radially inwardly from the first plurality of openings. It will, of course, be understood that "axially" is intended to include constructions where the openings are skewed, as is common in contemporary rotor constructions. A mass of cast conductive material is arranged to fill both pluralities of openings and to form end rings at the ends of the stack, the end rings thus being formed integrally with the material in both pluralities of openings.

A further improvement lies in the provision of two additional groups of at least one lamination each respectively arranged at each end of the first group. The additional groups each have third and fourth pluralities of openings extending axially and communicating respectively with the first and second pluralities of openings. The openings of the third plurality are substantially larger than those of the first plurality so as to provide a transition area between the small area of the first plurality of openings and the large area of the end rings.

In the drawing, Figure 1 is a side view, partly broken away and partly in section, of an induction motor having the improved rotor structure of this invention;

Figure 2 is a view of a lamination used in the formation of the improved rotor of this invention;

Figure 3 is a fragmentary view of a lamination which may be used in conjunction with the lamination of Figure 2 to provide further improvements in the rotor of this invention; and Figure 4 is a fragmentary view of a modification of the lamination of Figure 3.

Referring now to Figures 1 to 3 of the drawing, there is shown an induction motor, generally indicated at 1, having a stator core 2 secured to a shell 3, the stator core being formed of a plurality of relatively thin laminations 4 of magnetic material. Shell 3 is formed with a base section 5 and is adapted to complete the motor enclosure in cooperation with a pair of end shields 6 and 7, each of which is provided with a bearing structure (not shown) for rotatably supporting shaft 8. Rigidly secured to shaft 8 is a rotor 9 which has its major portion formed of a stack of relatively thin laminations 10, the ends of the stack being preferably formed of laminations 11 as will be more fully explained herebelow. Stator core 4 is provided with windings such as 12 which may be of any type to provide self starting of the motor 1. Such types are well known and are not considered to be part of the invention; for instance, if the motor is a polyphase induction motor, self starting is automatically provided; in the event of single phase induction motors, self starting may be easily provided by the provision of two windings displaced in phase from each other.

Each lamination 10 of the rotor 9 is provided with a plurality of equispaced relatively small openings 13 arranged adjacent outer periphery 14. As shown in Figure 1, openings 13 of the laminations are arranged in alignment so as to form continuous openings extending axially throughout the length of the rotor core. Each lamination 10 is also provided with a plurality of relatively large equispaced openings 15 which are located radially inwardly from openings 13 relatively deep within the lamination. In the present embodiment, each opening 15 is aligned on a radius with every other openings 13, but it is to be understood that the invention is not necessarily limited to such an arrangement. Openings 15 are aligned, as is best seen in Figure 1, so as to form a continuous opening extending axially throughout the length of rotor core 9.

As stated before, a further improvement lies in the provision of a number of laminations 11 at each end of the stack. In the present embodiment, four such laminations are provided at each end, but it will be understood that different numbers of these laminations may be used to provide the further improvement. Where laminations 11 are provided, they are arranged so that each opening 16 is arranged in alignment with an opening 13 in the laminations 10 and each opening 20 is aligned with an opening 15. Once laminations 10 and 11 have been arranged with the various openings in alignment as set forth above, a casting operation is performed so as to fill openings 13 and 16 with bars 17 of conductive material, such as aluminum, openings 15 and 20 with bars 18 of the material, and so as to form end rings 19 integrally with both sets of bars. It will be seen that this structure will provide the desired squirrel cage arrangement for an induction motor rotor. In addition, the bars 18 in openings 15 and 20 provide the mechanical strength which is necessary to hold the rotor together when a cast material is used. Bars 18 are sufficiently removed from bars 17 so that the portion of lamination 10 between them will be unsaturated under all operating conditions. Bars 18 will not carry any appreciable amount of current because of their high reactance even though they join the same end rings 19 as the small bars 17; this high reactance results from the depth of openings 15 within the rotor core 9. Thus, the small bars will continue to carry the current and produce the motor torque in the usual manner regardless of the large bars which will, however, perform the necessary function of providing the mechanical strength which cannot be obtained with the small cross section of the material in openings 13. The provision of laminations 11 at each end is for a transition area between the small current carrying bars 17 in openings 13 and the end rings 19. In the absence of this transition area, the junction between the small bars of openings 13 and the end rings 19 has a reduced cross section which may cause undesirable excessive local heating and a reduction in mechanical strength due to the stresses occurring at the point where the rapid change in area occurs.

It will be apparent from the foregoing that the prime purpose of laminations 11 is to increase the area of the outer current-carrying bars 17 before they join end rings 19. This can be accomplished substantially equally well with a lamination such as that indicated at 21 in Figure 4, provided each opening 15 is radially aligned with one of the openings 13 in lamination 10. Lamination 21 is provided with openings or slots 22 of such dimensions that inner parts 23 of slots 22 are aligned with openings 15, and outer parts 24 of slots 22 are aligned with openings 13. Thus, parts 23 and 24 of slots 22 correspond, in effect, to openings 20 and 16 in Figure 3, the sole difference being that, in lamination 21, the openings are connected together. Slots 22 perform the same function as openings 16 and 20 of Figure 3, with part 23 of each slot connecting openings 15 with the ends of the stack, and the entire slot 22 providing a transition area greater than that of openings 13. A rotor stack including laminations 21 at each end may be used to particularly great economic advantage where, as is frequently the case, a supply of such laminations is readily available (in connection with the manufacture of other types of induction motors) without any additional tooling being required for manufacture.

It will thus be seen that this invention provides a rotor structure for high starting torque induction motors wherein the necessary high resistance small cross section current-carrying bars are provided by casting, with additional entirely separate openings being provided for bars to provide mechanical strength without carrying appreciable electric current. In addition, this invention provides an arrangement for the ends of the rotor whereby excessive local heat at the junction of the small cross section bars with the end rings is substantially eliminated and the mechanical strength of the rotor is, consequently, further improved.

While this invention has been explained by describing a particular embodiment thereof, it will be apparent that improvements and modifications may be made without departing from the scope of the invention as defined in the appended claims.

What we claim as new and desire to secure by Letters Patent of the United States is:

1. In an induction-type motor, a high resistance rotor comprising a stack formed of a plurality of laminations of magnetic material, said stack having a first plurality of spaced openings extending axially therethrough adjacent the periphery thereof, said stack further having a second plurality of spaced openings extending axially therethrough, and a mass of cast conductive material filling both said pluralities of openings and forming end rings at the respective ends of said stack, said end rings being formed integrally with the material in both said pluralities of openings, said second plurality of openings being located radially inwardly a substantial distance from said first plurality of openings thereby to preclude any substantial flow of current through the material in said second plurality of openings.

2. In an induction-type motor, a high resistance rotor comprising a stack formed of a plurality of laminations of magnetic material, said stack having a first plurality of spaced openings extending axially therethrough adjacent the periphery thereof, said stack further having a second plurality of relatively large spaced openings extending axially therethrough, and a mass of cast conductive material filling both said pluralities of openings and forming end rings at the respective ends of said stack, said end rings being formed integrally with the material in both said pluralities of openings, said second plurality of openings being located radially inwardly a substantial amount from said first plurality of openings thereby to preclude any substantial flow of current through the material in said second plurality of openings.

3. In an induction-type motor, a high resistance rotor comprising a stack formed of a plurality of laminations of magnetic material, said stack having a first plurality of relatively small equispaced openings extending axially therethrough adjacent the periphery thereof, said stack having a second plurality of equispaced openings extending axially therethrough, and a mass of cast conductive material filling both said pluralities of openings and forming end rings at the respective ends of said stack, said end rings being formed integrally with the material in both said pluralities of openings, said second plurality of openings being located radialy inwardly from said first plurality of openings at a substantial distance from said periphery thereby to preclude any substantial flow of current, through the material in said second plurality of openings.

4. In an induction-type motor, a high resistance rotor comprising a stack formed of a plurality of laminations of magnetic material, said stack comprising a first centrally located group of laminations having a first plurality of spaced openings extending axially therethrough adjacent the periphery thereof, said first group further having a second plurality of spaced openings extending axially therethrough and radially inwardly a substantial distance from said first plurality of openings, said stack further comprising two additional groups of at least one lamination each respectively arranged at each end of said first group, said additional groups each having third and fourth pluralities of openings extending axially therethrough and communicating respectively with said first and second pluralities of openings, the openings of said third plurality being substantially larger than the openings of said first plurality and a mass of cast conductive material filling all said pluralities of openings and forming end rings at the respective ends of said stack, said end rings being formed integrally with the material in said pluralities of openings.

5. In an induction-type motor, a high resistance rotor comprising a stack formed of a plurality of laminations of magnetic material, said stack comprising a first centrally located group of laminations having a first plurality of relatively small spaced openings extending axially therethrough adjacent the periphery thereof, said first group further having a second plurality of relatively large spaced openings extending axially therethrough and located radially inwardly a substantial distance from said first plurality of openings, said stack further comprising two additional groups of at least one lamination each respectively arranged at each end of said first group, said additional goups each having third and fourth pluralities of openings extending axially therethrough and communicating respectively with said first and second pluralities of openings, the openings of said third plurality being substantially larger than the openings of said first plurality, and a mass of cast conductive material filling all said pluralities of openings and forming end rings at the respective ends of said stack, said end rings being formed integrally with the material in said pluralities of openings.

6. In an induction-type motor, a high resistance rotor comprising a stack formed of a plurality of laminations of magnetic material, said stack comprising a first centrally located group of laminations having a first plurality of relatively small equispaced openings extending axially therethrough adjacent the periphery thereof, said first group further having a second plurality of relatively large equispaced openings extending axially therethrough and located radially inwardly from said first plurality of said openings at a substantial distance from said periphery, each of said second plurality of openings being arranged substantially on a radius with an opening of said first plurality, said stack comprising two additional groups of laminations each respectively arranged at each end of said first group, said additional groups each having third and fourth pluralities of openings extending axially therethrough and communicating respectively with said first and second pluralities of openings, the openings of said third plurality being substantially larger than the openings of said first plurality, and a mass of cast conductive material filling all said pluralities of openings and forming end rings at the respective ends of said stack, said end rings being formed integrally with the material in all said pluralities of openings.

7. In an induction-type motor, a high resistance rotor comprising a stack formed of a plurality of laminations of magnetic material, said stack comprising a first centrally located group of laminations having a first plurality of relatively small spaced openings extending axially therethrough adjacent the periphery thereof, said first group further having a second plurality of relatively large spaced openings extending axially therethrough and located radially inwardly a substantial distance from said first plurality of openings, each of the openings of said second plurality being located on a radius with an opening of said first plurality, said stack further comprising two additional groups of at least one lamination each respectively arranged at each end of said first group, said additional groups each having a plurality of slots extending axially therethrough and respectively communicating with both of said pluralities of openings, and a mass of cast conductive material filling both said pluralities of openings and said plurality of slots and forming end rings at the respective ends of said stack, said end rings being formed integrally with the material in said openings and said slots.

References Cited in the file of this patent

UNITED STATES PATENTS

| 1,190,054 | Wiard | July 4, 1916 |
| 1,610,816 | Rutherford | Dec. 14, 1926 |
| 1,695,946 | Bergman | Dec. 18, 1928 |

FOREIGN PATENTS

| 388,100 | Great Britain | Feb. 23, 1933 |
| 889,186 | Germany | Sept. 7, 1953 |